(12) United States Patent
Mathew et al.

(10) Patent No.: US 8,300,349 B2
(45) Date of Patent: Oct. 30, 2012

(54) SYSTEMS AND METHODS FOR FORMAT EFFICIENT CALIBRATION FOR SERVO DATA BASED HARMONICS CALCULATION

(75) Inventors: George Mathew, San Jose, CA (US); Suharli Tedja, San Ramon, CA (US); Hongwei Song, Longmont, CO (US); Robert A. Greene, Fort Collins, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 12 days.

(21) Appl. No.: 12/851,425

(22) Filed: Aug. 5, 2010

(65) Prior Publication Data
US 2012/0033316 A1 Feb. 9, 2012

(51) Int. Cl.
*G11B 21/02* (2006.01)
*G11B 5/09* (2006.01)

(52) U.S. Cl. ............... 360/75; 360/39; 360/46
(58) Field of Classification Search .................. None
See application file for complete search history.

(56) References Cited

U.S. PATENT DOCUMENTS

| | | | |
|---|---|---|---|
| 4,715,257 A | 12/1987 | Hoshiai et al. | |
| 4,777,544 A | 10/1988 | Brown et al. | |
| 5,086,475 A | 2/1992 | Kutaragi et al. | |
| 5,111,727 A | 5/1992 | Rossum | |
| 5,377,058 A | 12/1994 | Good et al. | |
| 5,814,750 A | 9/1998 | Read et al. | |
| 6,519,102 B1 | 2/2003 | Smith et al. | |
| 6,937,424 B2 | 8/2005 | Chang et al. | |
| 7,038,875 B2 | 5/2006 | Lou et al. | |
| 7,158,325 B1 | 1/2007 | Hu et al. | |
| 7,605,997 B2 * | 10/2009 | Yamazaki | 360/75 |
| 2005/0046982 A1 | 3/2005 | Liu et al. | |
| 2007/0268615 A1 | 11/2007 | McFadyen et al. | |
| 2008/0018786 A1 | 1/2008 | Kageyama et al. | |
| 2008/0071467 A1 | 3/2008 | Johnson et al. | |
| 2009/0299666 A1 | 12/2009 | Kang et al. | |
| 2011/0249361 A1 * | 10/2011 | Mathew et al. | 360/75 |

FOREIGN PATENT DOCUMENTS

WO  WO 02/093546    11/2001
WO  WO 2010/014078   2/2010

OTHER PUBLICATIONS

U.S. Appl. No. 12/851,455, filed Aug. 5, 2010, Mathew et al.
U.S. Appl. No. 12/856,782, filed Aug. 16, 2010, Mathew et al.
U.S. Appl. No. 12/875,734, filed Sep. 3, 2010, Mathew et al.
Fertner, A. "Frequency-Domain Echo Canceller With Phase Adjustment" IEEE Trans. on circuits and Systems-II; Analog and Digital Signal Processing, vol. 44, No. 10, Oct. 1997.
Liu, et al., "Head Disk Spacing Variation Suppression via Active Flying Height Control" IEEE Instrumentation and Measurement Technology Conf. Budapest, Hungary May 21-23, 2001.

* cited by examiner

*Primary Examiner* — Regina N Holder
(74) *Attorney, Agent, or Firm* — Hamilton DeSanctis & Cha

(57) ABSTRACT

Various embodiments of the present invention provide systems and methods for servo data based harmonics calculation. For example, a method for calculating harmonics is disclosed that includes: providing a data processing circuit; receiving a first data set derived from a data source during a servo data processing period; performing a first harmonics calculation using the first data set to yield a first harmonics ratio; receiving a second data set derived from a source other than the previously mentioned data source during a user data processing period; performing a second harmonics calculation using the second data set to yield a second harmonics ratio; and calculating a ratio of the first harmonics ratio to the second harmonics ratio.

20 Claims, 8 Drawing Sheets

SYSTEMS AND METHODS FOR FORMAT EFFICIENT CALIBRATION FOR SERVO DATA BASED HARMONICS CALCULATION

BACKGROUND OF THE INVENTION

The present inventions are related to systems and methods for transferring information to and from a storage medium, and more particularly to calibration systems and methods for accurately positioning a sensor in relation to a storage medium.

Various electronic storage media are accessed through use of a read/write head assembly that is positioned in relation to the storage medium. The read/write head assembly is supported by a head actuator, and is operable to read information from the storage medium and to write information to the storage medium. The distance between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature destruction of the storage device.

In a typical storage device, fly height is set to operate in a predetermined range. During operation, the fly height is periodically measured to assure that it remains in the predetermined region. A variety of approaches for measuring fly height have been developed including optical interference, spectrum analysis of a read signal waveform, and measuring a pulse width value of the read signal. Such approaches in general provide a reasonable estimate of fly height, however, they are susceptible to various errors. In some cases, fly height has been measured by utilizing harmonic measurements based upon periodic data patterns written to the user data regions of a storage medium. Such approaches are problematic as they reduce the amount of storage that may be maintained on a given storage medium.

In some cases, fly height has been measured by utilizing harmonic measurements based upon periodic data patterns written to or available in the servo data regions of a storage medium. These approaches facilitate format saving since harmonic sensing is done based on data already available in the servo data region and no extra patterns need to be written to the servo region for harmonic sensing purpose. However, the harmonic measurements made from this are prone to errors contributed by variations in electronic circuits through which the servo signal pass through before harmonic computations are done. These changes in circuits are caused by changes in environmental conditions such as temperature, voltage, or altitude.

Hence, for at least the aforementioned reasons, there exists a need in the art for advanced calibration systems and methods for positioning a sensor in relation to a storage medium using servo data based harmonics sensing.

BRIEF SUMMARY OF THE INVENTION

The present inventions are related to systems and methods for transferring information to and from a storage medium, and more particularly to calibration systems and methods for accurately positioning a sensor in relation to a storage medium.

Various embodiments of the present invention provide methods for calculating harmonics. Such methods include providing a data processing circuit; receiving a first data set derived from a data source during a servo data processing period; performing a first harmonics calculation using the first data set to yield a first harmonics ratio; receiving a second data set derived from a source other than the previously mentioned data source during a user data processing period; performing a second harmonics calculation using the second data set to yield a second harmonics ratio; and calculating a ratio of the first harmonics ratio to the second harmonics ratio.

In some instances of the aforementioned embodiments, the data processing circuit includes a preamplifier circuit operable to receive an analog input signal derived from either of the first data source or the second source, and to provide a data output from which the first data set is derived. In such instances, the method further includes bypassing the preamplifier circuit such that the data output is derived directly from the analog input signal derived from the second data source. In some cases the first data source is a read/write head assembly and the second data source is a periodic data circuit operable to provide a periodic output signal.

In other instances of the aforementioned embodiments, the data source is a read/write head assembly operable to receive information from a storage medium and the data processing circuit further comprises a preamplifier circuit operable to receive an analog input signal from either the read/write head assembly or the second data source. The preamplifier circuit provides a data output from which both the first data set and the second data set are derived. In such instances, the method further includes bypassing the read/write head assembly such that the second data source is selected to provide the analog input signal. In some cases, the second data source is a periodic data circuit operable to provide a periodic output signal.

Some instances of the aforementioned embodiments include determining an operational change. In such instances, the second data set is received during the user data processing period, and performing the second harmonics calculation is done based at least in part upon determining the operational change. In some cases, the operational change includes a combination of one or more of a voltage change, a temperature change, and/or an altitude change.

Other embodiments of the present invention provide data processing systems. Such data processing systems include: a first data source, a second data source, an input circuit and a harmonic calculation circuit. The input circuit is configurable to receive data from the first data source during a servo data processing period, and to receive data from the second data source during a user data processing period. The harmonic calculation circuit is operable to calculate a first harmonic value based on data derived from the first data source and to calculate a second harmonic value based on data derived from the second data source. In some instances of the aforementioned embodiments, the first harmonic value is a first harmonic ratio and the second harmonic value is a second harmonic ratio. In some such instances, the harmonic calculation circuit is further operable to calculate an output ratio of the first harmonic ratio and the second harmonic ratio.

In various instances of the aforementioned embodiments, the data processing circuit further includes a servo data processing circuit operable to process data derived from the first data source during the servo data processing period, and a user data processing circuit operable to process data derived from the first data source during the user data processing period. In one or more instances of the aforementioned embodiments, the data processing circuit further includes an operation status sensor circuit. In such instances, configuring the input circuit is based at least in part on an output of the operation status circuit. In some such instances, the operation status sensor circuit receives one or more status inputs. As an example, the one or more status inputs may be an altitude input, a voltage input, and/or a temperature input.

Yet other embodiments of the present invention provide hard disk drive systems that include: a storage medium; a read/write head assembly operable to receive a first data set from the storage medium; a periodic data circuit operable to provide a periodic data set; an input circuit configurable to receive the first data set during a servo data processing period, and either the periodic data set or a second data set from the storage medium during a user data processing period; and a harmonic calculation circuit. In such cases, the harmonic calculation circuit is operable to calculate a first harmonic value based on a portion of the first data set, and to calculate a second harmonic value based at least in part on of the periodic data set.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5b is a cross sectional view showing the relationship between the disk platter and the read/write head assembly of the storage device of FIG. 5a.

DETAILED DESCRIPTION OF THE INVENTION

The present inventions are related to systems and methods for transferring information to and from a storage medium, and more particularly to calibration systems and methods for accurately positioning a sensor in relation to a storage medium.

Figure 1:
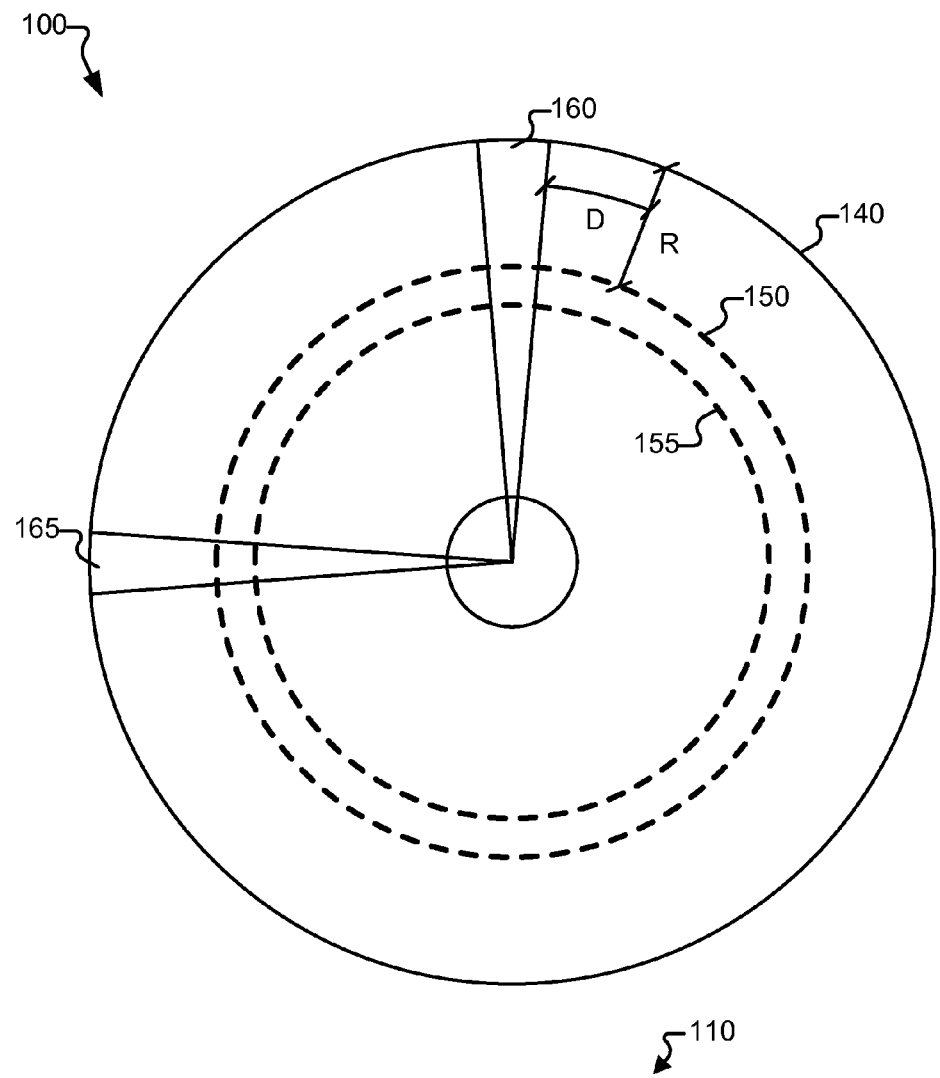
FIG. 1 depicts an existing storage medium including servo data regions and user data regions.
Figure 1:
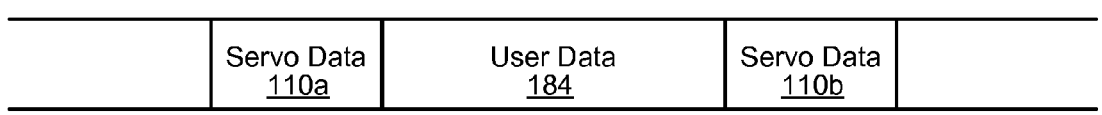

Turning to FIG. 1, a storage medium 100 is shown with two exemplary tracks 150, 155 indicated as dashed lines. The tracks are segregated by servo data written within wedges 160, 165. These wedges include servo data 110 that are used for control and synchronization of the read/write head assembly over a desired location on storage medium 100. In particular, this servo data generally includes a preamble pattern 152 followed by a servo address mark 154 (SAM). Servo address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 158. Between the bit patterns 110, a user data region 184 is provided.

In operation, storage medium 100 is rotated in relation to a sensor that senses information from the storage medium. In a read operation, the sensor would sense servo data from wedge 160 (i.e., during a servo data period) followed by user data from a user data region between wedge 160 and wedge 165 (i.e., during a user data period) and then servo data from wedge 165. In a write operation, the sensor would sense servo data from wedge 160 then write data to the user data region between wedge 160 and wedge 165. Then, the sensor would be switched to sense a remaining portion of the user data region followed by the servo data from wedge 165.

Various embodiments of the present invention may use periodic information included in the servo data to control the fly height of the read-write head from the storage medium in a storage system. Servo data based fly height calculations may be done by calculating two frequency harmonics from the periodic portion of the servo data during a servo data period. A ratio of the harmonics is then calculated that can be used in known fly height calculations to provide fly height feedback governing the distance of a head from a storage medium. Using such an approach preserves storage space on the storage medium for other uses when periodic data from the servo data regions is used for fly height calculation. This results in improved format efficiency as portions of the user data region are not allocated to fly height control.

The above described advantages of servo data harmonics based fly-height control can be realized only if some calibration scheme is developed to compensate the errors introduced by changes in the electronics circuits caused by variations in the environmental conditions of the storage system such as temperature, voltage, altitude, and/or the like. Since the measured harmonics ratio is the product of the harmonics ratio of the signal at the output of the read/write head assembly and the harmonics ratio of frequency response of the electronics circuits in the signal path, any change in the circuits cause an error to occur in the measured harmonic ratio. These errors can be calibrated out by measuring the harmonic contributions arising from these circuits separately. Doing this calibration requires providing additional measurement time in the servo field, which causes loss in format efficiency. In some cases, the calibration also requires providing additional time for some of the electronics circuits to switch from normal servo configuration to the calibration configuration, which also results in loss in format efficiency. Some of the approaches disclosed herein perform the aforementioned calibration without causing loss in format efficiency, by choosing to do the calibration harmonic measurement during a user data region that follows the servo data region. Further, the calibration measurement may only be done only when the status of the environmental conditions change beyond a certain threshold from one measurement to another. Based on the disclosure provided herein, one of ordinary skill in the art will recognize a variety of other advantages that may be achieved by implementation of circuits, systems and methods in accordance with the different embodiments of the present invention.

Figure 2A:
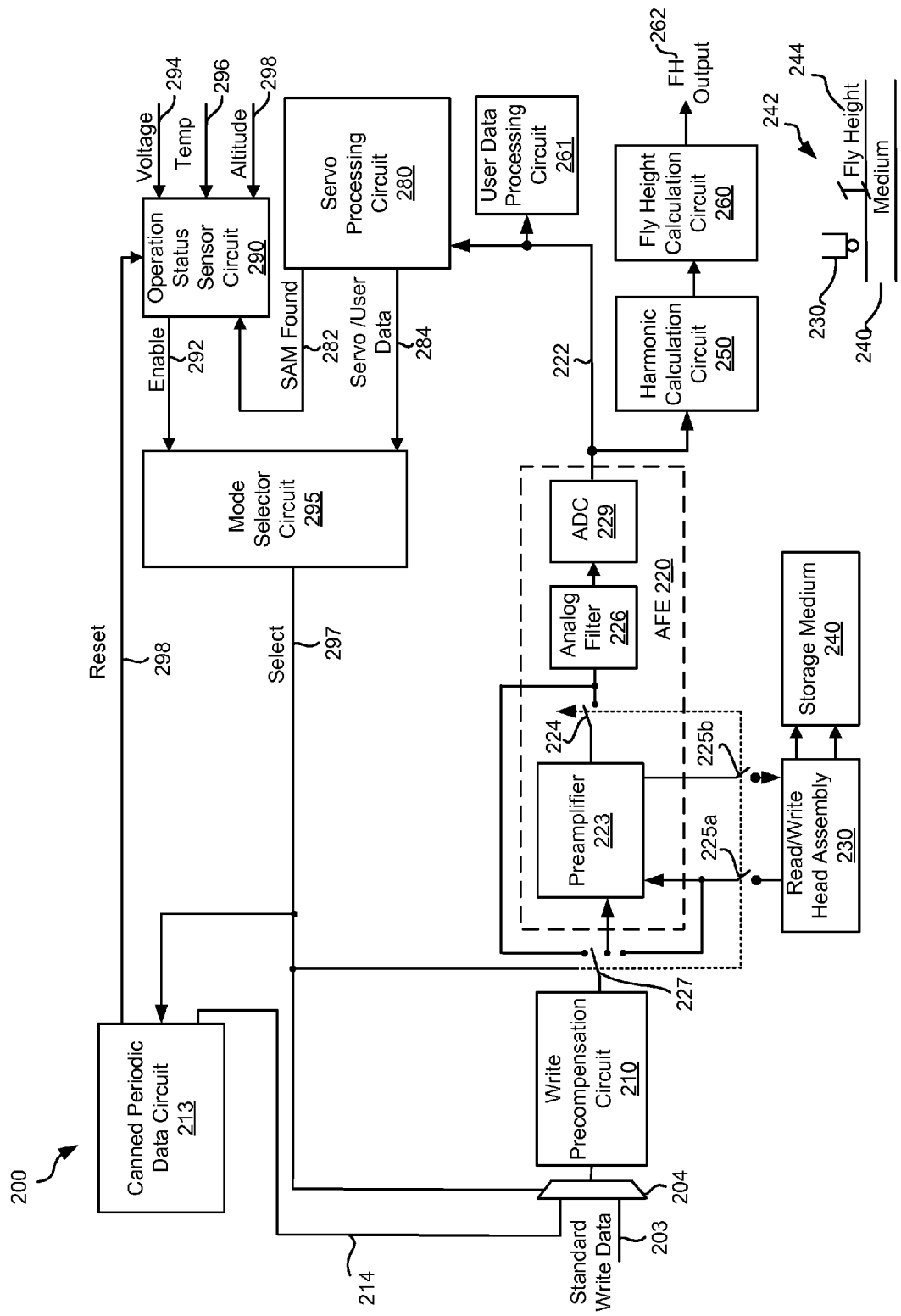
FIGS. 2a-2c depicts a harmonics calculation circuit in accordance with one or more embodiments of the present invention.

Turning to FIG. 2, a harmonics circuit 200 is depicted in accordance with one or more embodiments of the present invention. Circuit 200 includes a write precompensation circuit 210 that receives data to be written to a storage medium 240 in a digital form and provides an analog representation of the received data to an analog front end circuit 220. Write precompensation circuit 210 may be any circuit known in the art that accepts data and prepares it for writing to a storage medium. The data provided to write precompensation circuit 210 may be a standard write data 203 derived from an upstream data circuit (not shown), periodic data 214 generated by a canned periodic data circuit 213. Standard write data 203 may be provided by any circuit known in the art that provides information to be written to a storage medium. Canned periodic data circuit 213 stores a series of digital values that when converted to an analog format yield a periodic signal. In some embodiments of the present invention, the periodic signal contains two or more harmonics of a given frequency. The selection between periodic data 214 and standard write data 203 is made by a multiplexer circuit 204 that is controlled by a select input 297.

Write precompensation circuit 210 provides a continuous write signal to an analog front end circuit 220. Analog front end circuit 220 may be any analog front end circuit known in the art. As shown, analog front end circuit 220 includes a preamplifier circuit 223, an analog filter circuit 226, and analog to digital converter circuit 229. The continuous write signal from write precompensation circuit 210 is received by preamplifier circuit 223 that amplifies the signal and provides the amplified result to a read/write head assembly 230 that causes information corresponding to the signal to be written to a storage medium 240. In some embodiments, the storage medium is a magnetic storage medium, and the read/write head assembly converts the signal from preamplifier circuit 223 to magnetic information. Based upon the disclosure provided herein, one of ordinary skill in the art will recognize a variety of read/write head assemblies and storage media that may be used in relation to different embodiments of the present invention.

When data is read back from storage medium 240 by read/write head assembly 230, an electrical signal representing the data is transferred to preamplifier circuit 223 where it is amplified and passed to analog filter circuit 226. Analog filter circuit 226 filters the received signal and provides a corresponding filtered signal to analog to digital filter circuit 229. Analog to digital converter circuit 229 provides a series of digital samples 222 corresponding to the received data.

Figure 2B:
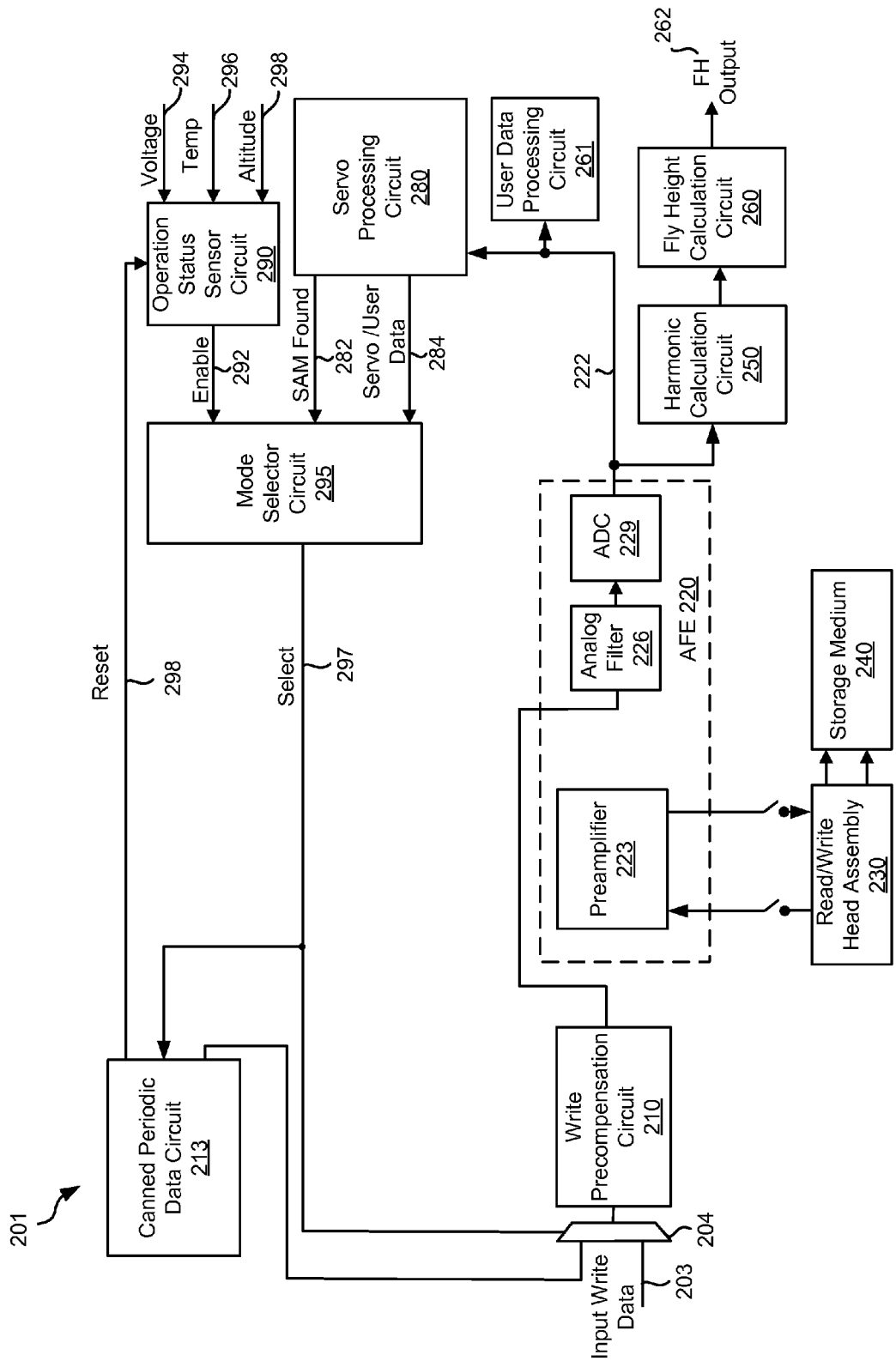
Figure 2C:
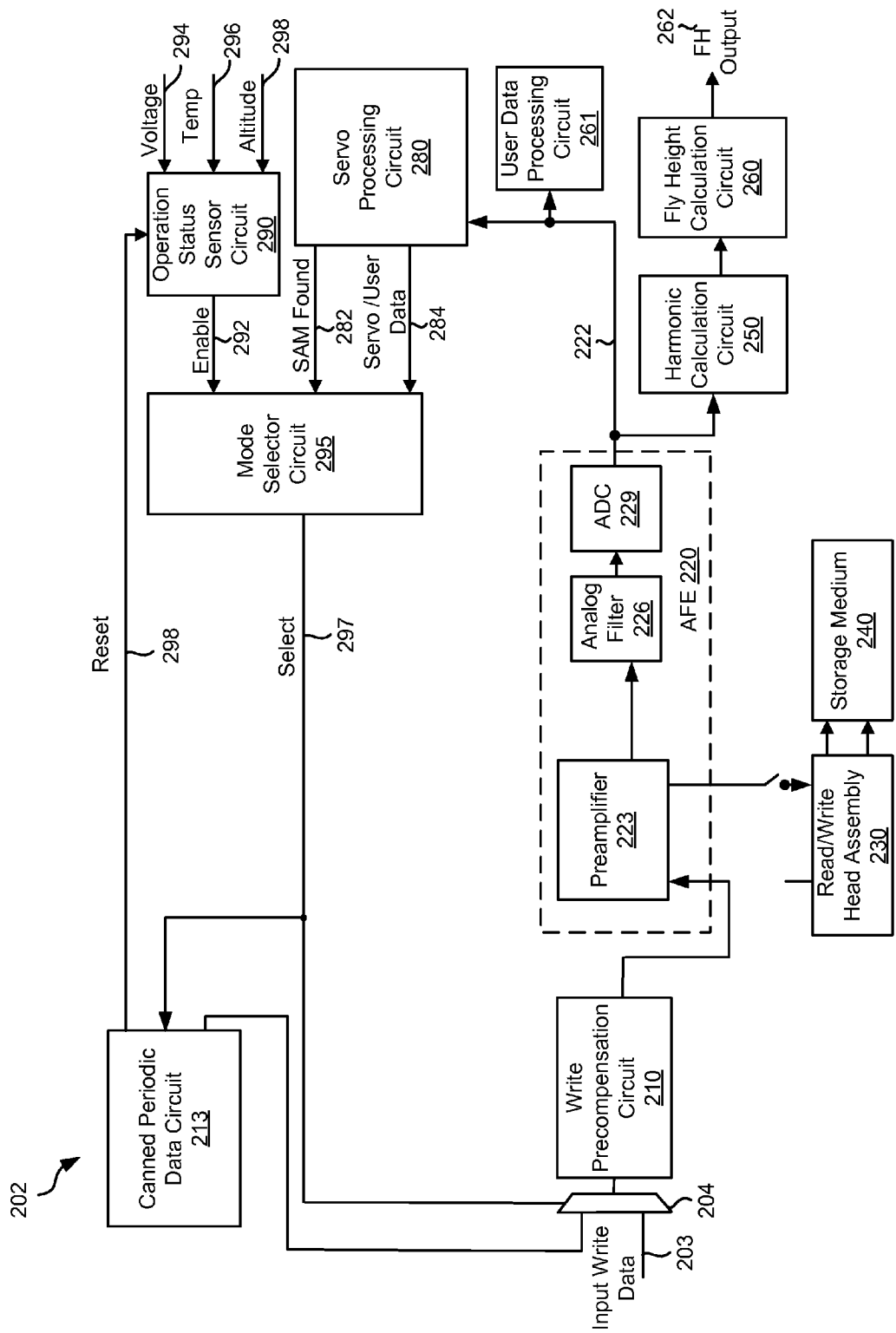

Select input 297 also controls a switch 227, switches 225a, 225b, and a switch 224. Control of switches 227, 225, 224 allows for selectively connecting write precompensation circuit 210 to an analog filter circuit 226 as shown in FIG. 2b, and thereby disconnecting a preamplifier circuit 223, a read/write head assembly 230 and storage medium 240. In this way, the data from write precompensation circuit 210 bypasses preamplifier circuit 223 and goes straight to analog filter circuit 226. Alternatively, switches 227, 225, 224 selectively connect an output from write precompensation circuit 210 directly through preamplifier circuit 223 to analog filter circuit 226, and thereby disconnecting read/write head assembly 230 and storage medium as shown in FIG. 2c. In this way, the data from write precompensation circuit 210 bypasses read/write head assembly 230 and storage medium 240, and is connected directly from write precompensation circuit 210 through preamplifier circuit 223 to analog filter circuit 226. Either of these configurations may be used in determining harmonics used in relation to controlling the fly height of the read-write head assembly 230 from the storage medium 240 in accordance with different embodiments of the present invention. Read/write head assembly 230 may be any circuit or device known in the art that is capable of sensing information from a storage medium and providing an electrical signal representative of the sensed information, and for receiving an electrical signal and storing information corresponding to the electrical signal to the storage medium.

Digital samples 222 are provided to a user data processing circuit 261 and/or other recipient circuits. User data processing circuit 261 may be, but is not limited to, a data detector circuit as are known in the art. In addition, digital samples 222 are provided to a servo processing circuit 280. Servo processing circuit 280 may be any circuit known in the art that is capable of receiving an input data stream, and identifying and processing servo data fields in the input data stream. Servo data processing circuit 280 provides an output 284 indicating that servo data or user data is being received, and an output 282 indicating that the servo address mark is found.

An operation status sensor circuit 290 receives a voltage input 294, a temperature input 296, and an altitude input 298. Operation status sensor circuit 290 asserts an enable signal 292 whenever a predetermined one of or a combination of voltage input 294, temperature input 296, and altitude input 298 indicate a substantial change in operational status of a storage system in which harmonics circuit 200 is implemented and output 282 is asserted. Such a change in status may indicate a change in a fly height 244 (i.e., a distance between read/write head assembly 230 and storage medium 240) as shown in a cross section 242. The combination of one or more of voltage input 294, temperature input 296, and altitude input 298 may be selected based upon the different sensitivities of the particular storage system. Based upon the disclosure provided herein, one of ordinary skill in the art will recognize a variety of status indicators in addition to temperature, voltage and altitude to indicate a change in the status or environment of the storage system that may be used in relation to different embodiments of the present invention. Enable signal 292 is de-asserted when a reset input 298 from canned periodic data circuit 213 is asserted.

A mode selector circuit 295 asserts select input 297 whenever enable signal 292 is asserted and the user data region is indicated by output 284. Assertion of select input 297 causes a periodic pattern generated by canned periodic data circuit 213 to be provided to write precompensation circuit via multiplexer 204. Canned periodic data circuit 213 asserts reset input 298 once a predetermined number of bits of the periodic pattern have been provided after the assertion of select input 297. This periodic pattern is used to calculate harmonics as described below. At some point after the end of the current servo data region and while traversing the current user data region, select input 297 is de-asserted causing the circuit to switch back to a regular processing mode where data is read from storage medium 240 via read/write head assembly 230. This allows for proper operation of the tracking mode where the next servo data region is identified on storage medium 240, and data from storage medium 240 is used to properly position read/write head assembly 230 in relation to storage medium 240. Once the positioning is completed in the tracking mode, a switch back to feeding the periodic pattern from canned periodic data circuit 213 to write precompensation circuit 210 may be done where operation status sensor circuit 290 indicates a continued operational anomaly.

Digital samples 222 are provided to a harmonic calculation circuit 250. In describing the operation of harmonic calculation circuit 250, let x[n], for n equal to 0, 1, 2 ... N−1 denote one cycle of periodic data 214 provided by canned periodic data circuit 213. Where, for example, periodic data 214 from canned periodic data circuit 213 is similar to quarter rate burst demodulation data, N is equal to sixteen. As another example, where periodic data 214 from canned periodic data circuit 213 is similar to half rate burst demodulation data, N is equal to eight. Depending upon the harmonic frequencies to be used in fly height control, periodic patterns with different period N can be chosen. Each of the received samples, x[n], are gain adjusted. If there are M cycles of the canned periodic pattern, these periods may be averaged together to result in an averaged cycle of data samples for use in computing the harmonic values. Further, canned periodic data samples from multiple user data sectors may be used by averaging the harmonic values from multiple sectors together and taking the ratio of the averaged harmonic values. Using data from multiple sectors or servo data sets reduces the effect of circuit noise in computed values of harmonic strengths and harmonic ratio.

Based on the aforementioned, harmonic calculation circuit 250 calculates harmonics for the frequencies of interest in accordance with the following equation:

$$H_k = \sum_{n=0}^{N-1} x[n] \cdot c_k[n] - j \sum_{n=0}^{N-1} x[n] \cdot s_k[n] \text{ where } x[n] = \frac{1}{M} \sum_{l=0}^{M-1} y(n+lN).$$

Here, y[n] denotes M cycles of the samples of the periodic data in a sector before averaging and x[n] denotes one cycle of these samples after averaging. Further, $c_k[n]$ and $s_k[n]$ denote the discrete Fourier transform (DFT) kernals for the k-th harmonic. For periodic data 214 from canned periodic data circuit 213 that is similar to half rate burst demodulation data where $k \in \{1,3\}$, the values for $c_k[n]$ and $s_k[n]$ are as follows:

$c_1[n]=\{1.00,0.7071,0.00,-0.7071,-1.00,-0.7071, 0.00,0.7071\};$ $s_1[n]=\{0.00,0.7071,1.00,0.7071,0.00,-0.7071,-1.00, 0.7071\};$ $c_3[n]=\{1.00,-0.7071,0.00,0.7071,-1.00,0.7071, 0.00,-0.7071\};$ and $s_1[n]=\{0.00,0.7071,-1.00,0.7071,0.00,-0.7071, 1.00,-0.7071\}.$ For periodic data 214 from canned periodic data circuit 213 that is similar to quarter rate burst demodulation data where $k \in \{1,3,5,7\}$, the values of $c_k[n]$ and $s_k[n]$ are as follows:

$$\{c_k[n], s_k[n]\} = \begin{bmatrix} 1.000 & 0.000 \\ 0.9239 & 0.3827 \\ 0.7071 & 0.7071 \\ 0.3827 & 0.9239 \\ 0.000 & 1.000 \\ -0.3827 & 0.9239 \\ -0.7071 & 0.7071 \\ -0.9239 & 0.3827 \\ -1.000 & 0.000 \\ -0.9239 & -0.3827 \\ -0.7071 & -0.7071 \\ -0.3827 & -0.9239 \\ -0.000 & -1.000 \\ 0.3827 & -0.9239 \\ 0.7071 & -0.7071 \\ 0.9239 & -0.3827 \end{bmatrix}_{k=1} \begin{bmatrix} 1.000 & 0.000 \\ 0.3827 & 0.9239 \\ -0.7071 & 0.7071 \\ -0.9239 & -0.3827 \\ -0.000 & -1.000 \\ 0.9239 & -0.3827 \\ 0.7071 & 0.7071 \\ -0.3827 & 0.9239 \\ -1.000 & 0.000 \\ -0.3827 & -0.9239 \\ 0.7071 & -0.7071 \\ 0.9239 & 0.3827 \\ 0.000 & 1.000 \\ -0.9239 & 0.3827 \\ -0.7071 & -0.7071 \\ 0.3827 & -0.9239 \end{bmatrix}_{k=3}$$

$$\begin{bmatrix} 1.000 & 0.000 \\ -0.3827 & 0.9239 \\ -0.7071 & -0.7071 \\ 0.9239 & -0.3827 \\ 0.000 & 1.000 \\ -0.9239 & -0.3827 \\ 0.7071 & -0.7071 \\ 0.3827 & 0.9239 \\ -1.000 & 0.000 \\ 0.3827 & -0.9239 \\ 0.7071 & 0.7071 \\ -0.9239 & 0.3827 \\ -0.000 & -1.000 \\ 0.9239 & 0.3827 \\ -0.7071 & 0.7071 \\ -0.3827 & -0.9239 \end{bmatrix}_{k=5} \begin{bmatrix} 1.000 & 0.000 \\ -0.9239 & 0.3827 \\ 0.7071 & -0.7071 \\ -0.3827 & 0.9239 \\ -0.000 & -1.000 \\ 0.3827 & 0.9239 \\ -0.7071 & -0.7071 \\ 0.9239 & 0.3827 \\ -1.000 & 0.000 \\ 0.9239 & -0.3827 \\ -0.7071 & 0.7071 \\ 0.3827 & -0.9239 \\ -0.000 & 1.000 \\ -0.3827 & -0.9239 \\ 0.7071 & 0.7071 \\ -0.9239 & -0.3827 \end{bmatrix}_{k=7}$$

For any general value of N, the values of $c_k[n]$ and $s_k[n]$ are as follow:

$$c_k[n] = \cos\left(\frac{2\pi nk}{N}\right), s_k[n] = \sin\left(\frac{2\pi nk}{N}\right)$$

for k=0, 1, . . . , N−1 and n=0, 1, . . . , N−1. It should be noted that other parameters may be used in relation to different embodiments of the present invention.

Based on the aforementioned, harmonic calculation circuit 250 calculates squared values of the harmonics for the frequencies of interest in accordance with the following equation:

$$|H_k|^2 = H_{k,r}^2 + H_{k,i}^2 \text{ where } H_{k,r} = \sum_{n=0}^{N-1} x[n] \cdot c_k[n],$$

$$H_{k,i} = \sum_{n=0}^{N-1} x[n] \cdot s_k[n].$$

Here, $H_{k,r}$ and $H_{k,i}$ are the real and imaginary parts, respectively, of the strength $H_k$ of k-th harmonic. To minimize the effect of circuit noise on these estimated harmonic strengths, as explained earlier, the harmonic strengths estimated from multiple sectors may be averaged together in accordance with the following equation:

$$S_k = \frac{1}{N_s} \sum_{l=1}^{N_s} \{|H_k|^2 \text{ from } l\text{-}th \text{ sector}\}$$

where $N_s$ is the number of sectors used for averaging. The harmonic ratio is computed from $S_k$ in accordance with the following equation:

$$R(k_1, k_2) = \frac{S_{k1}}{S_{k2}}$$

where $(k_1, k_2)$ is equal to, for example, (1,3) for half-rate pattern and any pair from among {1,3,5,7} for quarter-rate pattern.

The harmonic ratio calculated by harmonic calculation circuit 250 is provided to a fly height calculation circuit 260 that calculates fly height 244 and provides a fly height output 262 to a fly height controller (not shown). The fly height calculation may be any harmonic based fly height calculation known in the art. Further, it should be noted that harmonic calculation circuit 250 may implement any harmonics calculation algorithm known in the art.

Figure 3:
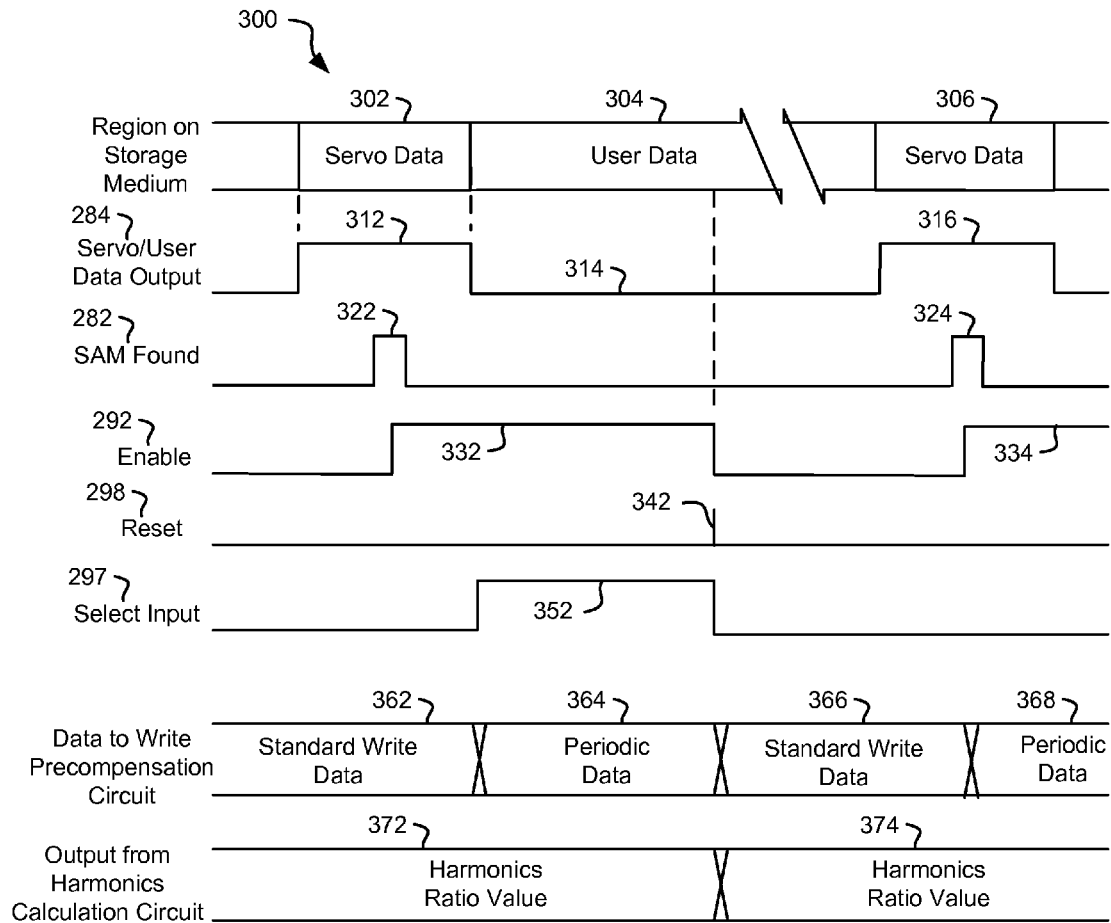
FIG. 3 is a timing diagram showing an exemplary operation of the harmonics circuit of FIGS. 2a-2c in accordance with one or more embodiments of the present invention.

A timing diagram 300 of FIG. 3 shows an exemplary operation of harmonics circuit 200 in accordance with one or more embodiments of the present invention. In operation, whenever data is being read from storage medium 240 or written to storage medium 240 servo data is being read from storage medium 240 as part of tracking the location on storage medium. As servo data 302 is provided from analog to digital converter circuit 229, servo processing circuit 280 asserts output 284 during a period 312 and subsequently asserts output 282 during a period 322. Once processing of servo data 302 is completed, output 284 is de-asserted during a period 314 corresponding to user data 304.

As shown, enable 292 is asserted during a period 332 upon assertion of output 282 indicating that a predetermined one or a combination of voltage input 294, temperature input 296, and altitude input 298 suggest a substantial change in operational status of a storage system in which harmonics circuit 200 is implemented. Once output 284 is de-asserted and enable 292 is asserted, select input 297 is asserted during a period 352. While select input 297 is asserted, the data presented to write precompensation circuit 210 transitions from standard write data 362 to periodic data 364. Once a defined amount of periodic data has been processed, canned periodic data circuit 213 asserts reset 298 during a period 342 resulting in de-assertion of enable 292 and select input 297. As select input 297 is de-asserted, the data presented to write precompensation circuit 210 transitions from periodic data 364 to standard write data 366. At the same point, a new harmonics ratio value 374 replaces a prior harmonics ratio value 372 at the output of harmonics calculation circuit 250.

In some cases, the process is repeated across a number of sectors and the resulting harmonics ratio values are averaged together. This averaging may be a running average done by harmonics calculation circuit 250. In such a case, enable 292 is re-asserted next time output 282 is asserted during a period 324 while processing servo data 306 during a period 316. Once output 284 is de-asserted, enable 292 is asserted during a period 334.

It should be noted that depending upon the particular circuit implementation, assertion of select input 297 causes a bypass of preamplifier circuit 223, read/write head assembly 230, and storage medium 240 as shown in FIG. 2b; or a bypass of read/write head assembly 230 and storage medium 240 as shown in FIG. 2c. Thus, an analog representation of periodic data 214 is provided via analog front end circuit 220 as a series of digital samples 222. Harmonic sensing is performed by harmonic calculation circuit 250 on the digital samples 222 corresponding to periodic pattern 214 to determine both the fundamental harmonic and the third harmonic of the data if the periodic data is a half rate signal. Other harmonics may be chosen depending upon the received periodic pattern. In one particular embodiment of the present invention, the harmonic sensing is done using a discrete Fourier transform that yields the fundamental and the third harmonic. Subsequently, the fundamental harmonic strength is divided by the third harmonic strength to yield a harmonic ratio that is provided to a fly height calculation circuit 260. In turn, the harmonic ratio is used by fly height calculation circuit 260 to calculate a fly height compensation value as is known in the art. The calculated value is provided as a fly height output 262.

Figure 4:
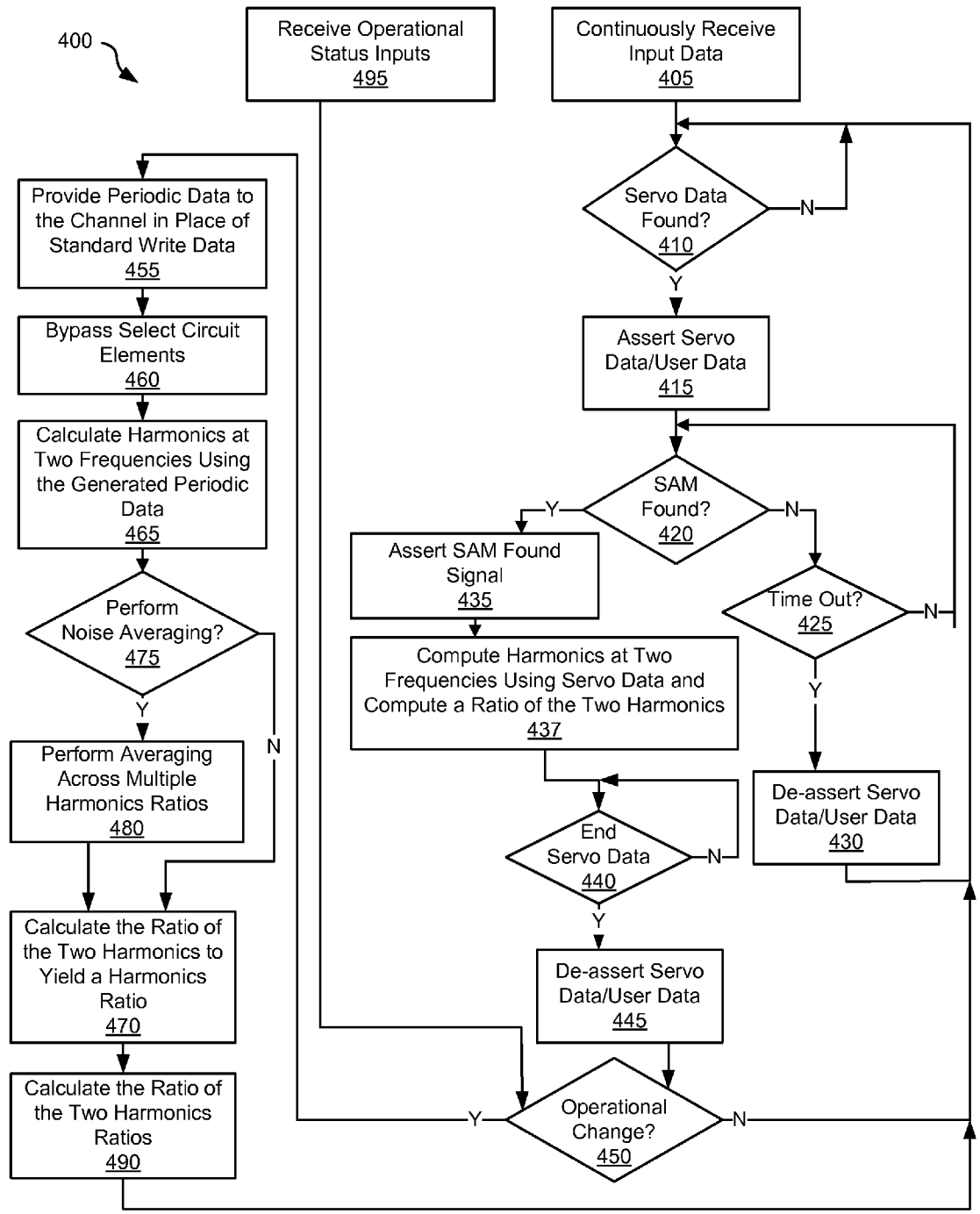
FIG. 4 is a flow diagram showing a method in accordance with some embodiments of the present invention for performing harmonics calculations.

Turning to FIG. 4, a flow diagram 400 shows a method in accordance with some embodiments of the present invention for performing harmonics calculations. Following flow diagram 400, a series of data inputs are received (block 405). The data inputs are derived from both the user data and servo data regions. In some cases, the data received during a write scenario includes some samples of the user data region directly preceding the servo data region followed by samples from the servo data region. Of note, the approach discussed herein allows for performing harmonics calculations based on periodic data patterns derived from a source other than a storage medium that is always available regardless of the location of a read/write head medium relative to the storage medium.

At the same time, one or more operational status inputs are received (block 495). The operational status inputs provide measures quantifying the status of a circuit. Such operational status inputs may include, but are not limited to, a voltage input, a temperature input, and/or an altitude input. Based upon the disclosure provided herein, one of ordinary skill in the art will recognize other status inputs and/or combinations thereof that may be used in relation to different embodiments of the present invention.

As the data is received, it is determined whether the data is from a servo data region (a wedge) or from a user data region (block 410). In some cases, this process includes looking for a preamble that is part of the servo data region using processes known in the art. Once the servo data region is identified (block 410), a servo data/user data signal is asserted indicating that the data being received is from the servo data region (i.e., during a servo data processing period) (block 415). The servo data processing continues processing the preamble data as is known in the art. Once the preamble data is processed, the servo address mark (SAM) data is received and processed as is known in the art. As part of receiving the SAM, it is determined whether the SAM has been found (block 420). Where the SAM is not yet found (block 420), it is determined whether a timeout condition has occurred (block 425). Such a timeout condition avoids a never ending look for the SAM. Where a timeout has not occurred (block 425), the process of looking for the SAM is continued (block 420). Alternatively, where a timeout condition has occurred (block 425), the servo data/user data signal is de-asserted indicating that the data being received is not from the servo data region (block 430).

Alternatively, where the SAM is found (block 420), a SAM found signal is asserted (block 435). Using the digital samples corresponding to the periodic data resulting from the servo data region on the storage medium 240, harmonics and harmonics ratio are computed (block 437). The resulting harmonics correspond to the product of the harmonic contribution due to the head-media signal and the read-path electronic circuits. It is then determined whether the servo data has completed processing (block 440). Where the servo processing has completed (block 440), the servo data/user data signal is de-asserted indicating that the data being received is not from the servo data region (i.e., it is from the user data region) (block 445).

It is then determined whether an operational change has occurred in the processing system (block 450). An operational change is indicated when a predetermined one or a combination of a voltage input, a temperature input, and an altitude input suggest a substantial change in operational status of a storage system. Where no operational change is indicated (block 450), standard processing continues.

Alternatively, where an operational change is indicated (block 450), predefined periodic data is provided as an input to the channel in place of standard write data (block 455). In addition, various circuit elements in the channel are bypassed (block 460). In one embodiment, a preamplifier, a read/write head assembly, and the storage medium are bypassed. In another embodiment, only the read/write head assembly and the storage medium are bypassed.

Harmonics for two different frequencies are calculated using the predefined periodic data (block 465). In one particular embodiment of the present invention where half rate data is available, the strengths of the first harmonic and the third harmonic frequency are calculated. Other harmonics may be used depending upon the available periodic data. It is then determined whether harmonics from multiple sectors are to be averaged to reduce circuit noise (block 475). Where noise averaging is not employed (block 475), a ratio of the previously computed harmonics (e.g., the fundamental frequency to the third harmonic frequency) is calculated to yield a harmonic ratio (block 470). Then, a ratio of the two previously calculated ratios (i.e., the harmonics ratio calculated based on the servo data (block 437) and the harmonics ratio calculated based on the periodic data (block 465)) is calculated and the results provided (block 490).

Alternatively, where noise averaging is employed (block 475), the harmonics calculated based upon the single set of predefined harmonics data is averaged together with harmonics calculated based on the single set of predefined harmonics data during other user data periods (block 480). Such an approach operates to reduce the effects of noise arising from the electronic circuits in the signal path. In some cases, the noise averaging includes taking the absolute values or squared absolute values of the harmonics calculated for the immediate sector and averaging that with the corresponding values of the harmonics for a number of other sectors. The ratio of the averaged harmonics is used as the average harmonic ratio. Once the average value is available, a ratio of the two previously calculated ratios (i.e., the harmonics ratio calculated based on the servo data (block 437) and the harmonics ratio calculated based on the periodic data (block 465)) is calculated and the results provided (block 490).

Figure 5A:
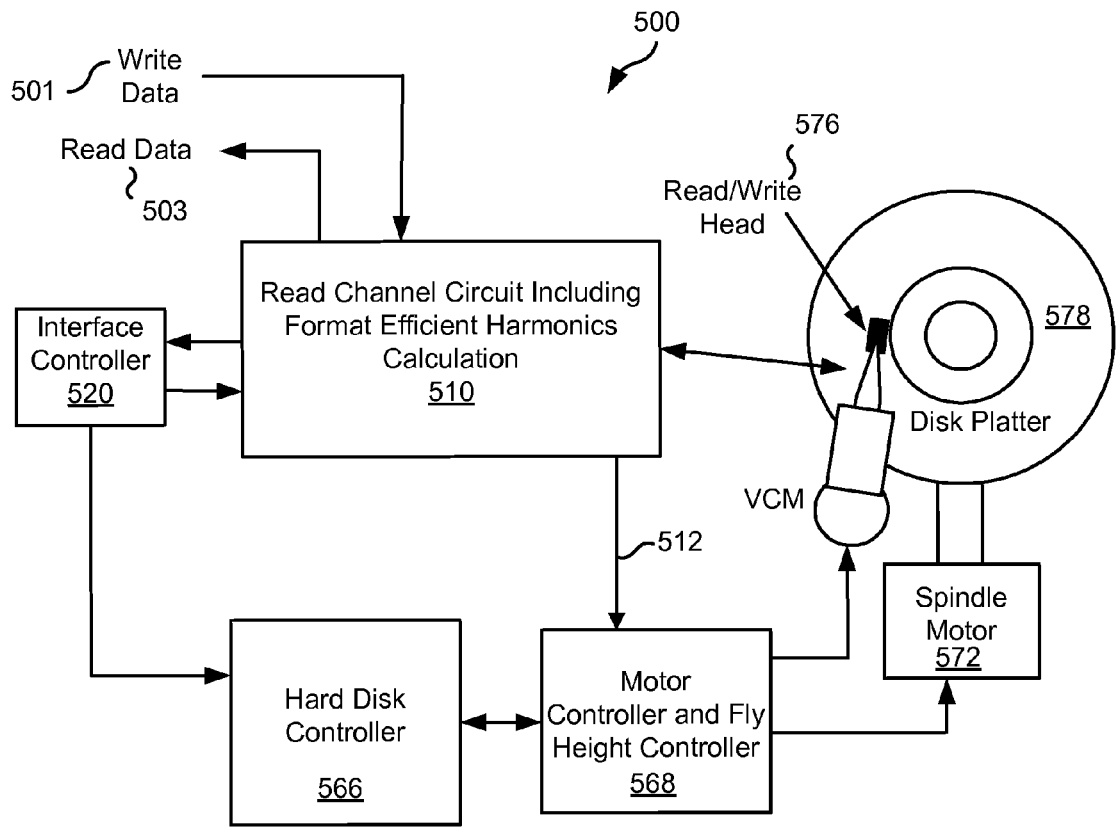
FIG. 5a depicts a storage device including a read channel including format efficient harmonics calculation in accordance with one or more embodiments of the present invention.

Turning to FIG. 5a, a storage device 500 including a read channel circuit 510 including servo data based harmonics determination is shown in accordance with one or more embodiments of the present invention. Storage device 500 may be, for example, a hard disk drive. Read channel circuit 510 includes format efficient harmonics determination that may be implemented consistent with that discussed in relation to FIG. 2 above, and/or may operate consistent with the method discussed above in relation to FIG. 4. Further, read channel circuit 510 may include a data detector, such as, for example, a Viterbi algorithm data detector, and/or a data decoder circuit, such as, for example, a low density parity check decoder circuit. In addition to read channel circuit 510, storage device 500 includes a read/write head assembly 576 disposed in relation to a disk platter 578. Read/write head assembly 576 is operable to sense information stored on disk platter 578 and to provide a corresponding electrical signal to read channel circuit 510.

Storage device 500 also includes an interface controller 520, a hard disk controller 566, a motor controller and fly height controller 568, and a spindle motor 572. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme. In other embodiments of the present invention, disk platter 578 includes magnetic signals recorded in accordance with a longitudinal recording scheme. Motor controller and fly height controller 568 controls the spin rate of disk platter 578 and the location of read/write head assembly 576 in relation to disk platter 578.

Figure 5B:
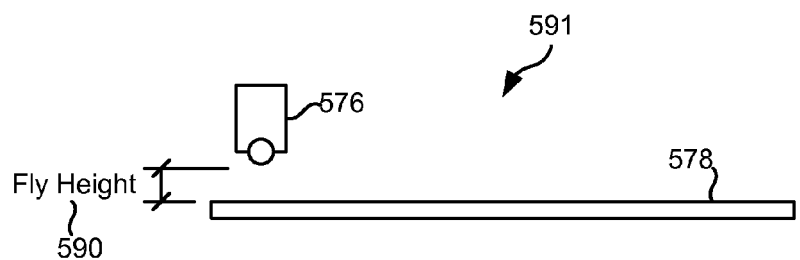

As shown in a cross sectional diagram 591 of FIG. 5b, the distance between read/write head assembly 576 and disk platter 578 is a fly height 590. Fly height 590 is controlled by motor controller and fly height controller 568 based upon a harmonics value 512 provided by read channel circuit 510.

In a typical read operation, read/write head assembly 576 is accurately positioned by motor controller and fly height controller 568 over a desired data track on disk platter 578. Motor controller and fly height controller 568 both positions read/write head assembly 576 in relation to disk platter 578 (laterally and vertically) and drives spindle motor 572 by moving read/write head assembly 576 to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is provided by read/write head assembly 576 to read channel circuit 510. In turn, read channel circuit 510 decodes and digitizes the received analog signal to recreate the information originally written to disk platter 578. This data is provided as read data 503 to a receiving circuit. A write operation is substantially the opposite of the preceding read operation with write data 501 being provided to read channel circuit 510. This data is then encoded and written to disk platter 578.

Figure 6:
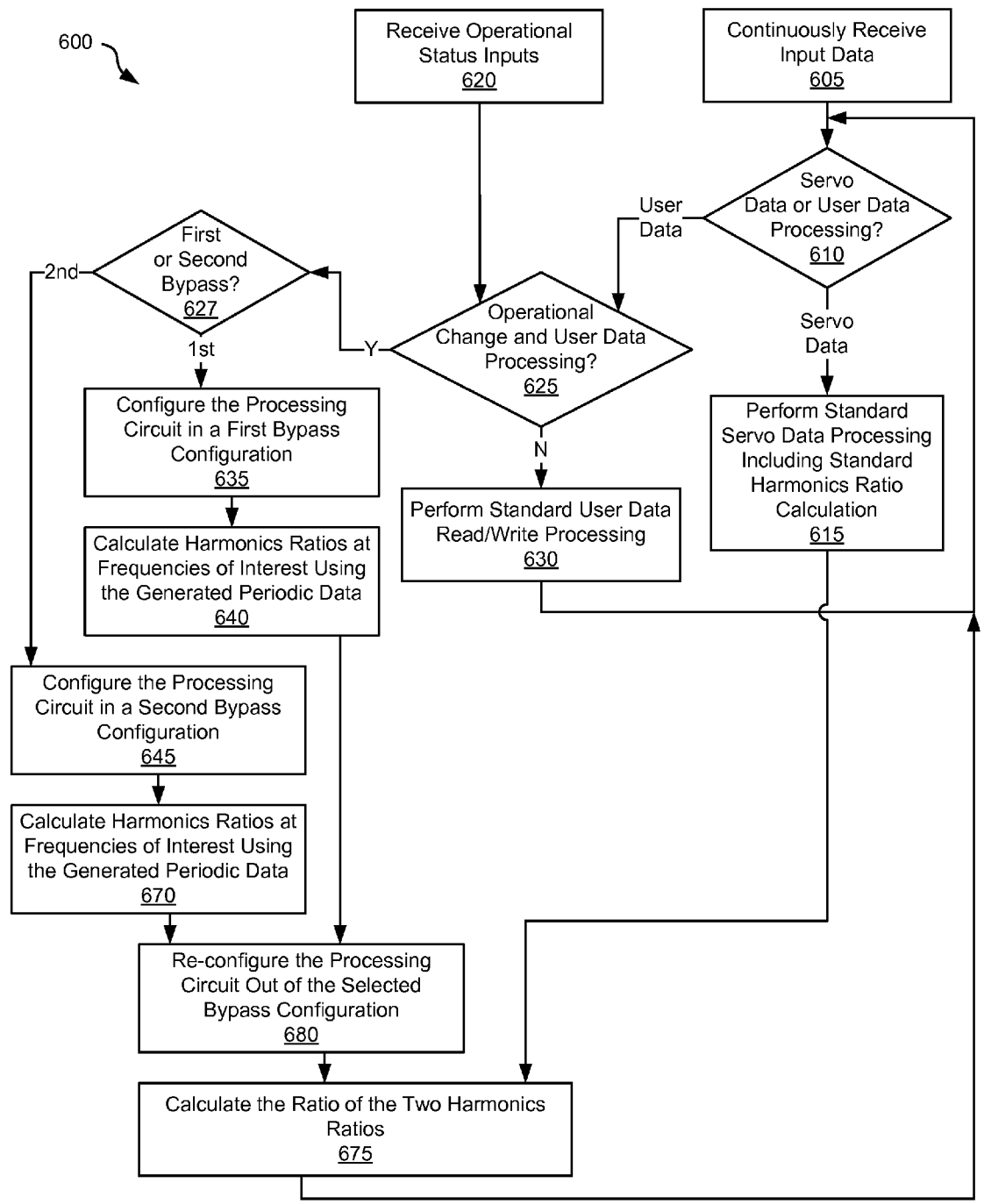
FIG. 6 is a flow diagram showing a method in accordance with some embodiments of the present invention for performing harmonics calculations using different component bypasses.

Turning to FIG. 6, a flow diagram 600 shows a method in accordance with some embodiments of the present invention for performing harmonics calculations using different component bypasses. Following flow diagram 600, a series of data inputs are received (block 605). The data inputs are derived from both the user data and servo data regions. In some cases, the data received during a write scenario includes some samples of the user data region directly preceding the servo data region followed by samples from the servo data region. Of note, the approach discussed herein allows for performing harmonics calculations based on periodic data patterns derived from a source other than a storage medium that is always available regardless of the location of a read/write head medium relative to the storage medium. The harmonics computed by the embodiments discussed in the current invention will be used to compensate the harmonics computed from head-medium signals for errors contributed by changes in operational status of the storage system.

At the same time, one or more operational status inputs are received (block 620). The operational status inputs provide measures quantifying the status of a circuit. Such operational status inputs may include, but are not limited to, a voltage input, a temperature input, and/or an altitude input. Based upon the disclosure provided herein, one of ordinary skill in the art will recognize other status inputs and/or combinations thereof that may be used in relation to different embodiments of the present invention.

As the data is received, it is determined whether the data is from a servo data region (a wedge) or from a user data region (block 610). In some cases, this process includes looking for a preamble that is part of the servo data region using processes known in the art. Where a servo data region is being received (block 610), standard servo data processing (i.e., any servo data processing approach known in the art) is performed (block 615). The standard servo processing includes computation of harmonics using periodic data derived from the servo data for two frequencies, and the calculation of a ratio of the two harmonics using any of the methods known in the art. Alternatively, where user data processing has begun (block 610), it is determined whether an operational change has occurred in the processing system (block 625). An operational change is indicated when a predetermined one or a combination of a voltage input, a temperature input, and an altitude input suggest a substantial change in operational status of a storage system. Where no operational change is indicated (block 625), standard processing continues (block 630).

Alternatively, where an operational change has occurred (block 625), the processing circuit is configured depending upon whether a first bypass option or a second bypass option is selected (block 627). Where the first bypass option is selected (block 627), the first bypass option is configured by setting up to receive generated periodic data at a write input circuit (e.g., a write precompensation circuit) for processing, and to bypass a read/write head assembly and a storage medium (e.g., similar to that shown in FIG. 2c) (block 635). During this processing, the analog front end circuit (i.e. block 220 in FIG. 2) is configured with parameters that are used during servo processing. For example, the corner frequencies of any AC coupler and/or analog filter circuit are switched to those used for servo data processing. As samples of the generated data are received, harmonics at frequencies of interest are calculated based thereon (block 640). Such harmonics calculation may be done using the approaches discussed herein, or any other approach known in the art for calculating frequency harmonics. A ratio of harmonics calculated using the generated data in the aforementioned configuration is calculated using approaches previously discussed herein to yield a ratio H1. H1 reflects the harmonics contribution from the analog front end circuit including the preamplifier circuit.

Where the second bypass option is selected (block 627), the processing circuit is configured to continue receiving generated periodic data at a write input circuit (e.g., a write precompensation circuit) for processing, and to bypass a preamplifier circuit, a read/write head assembly, and a storage medium (e.g., similar to that shown in FIG. 2b) (block 645). During this processing, the analog front end circuit (i.e., block 220 of FIG. 2b) is again configured with parameters that are used during servo processing. As samples of the generated data are received, harmonics at frequencies of interest are calculated based thereon (block 670). Such harmonics calculation may be done using the approaches discussed herein, or any other approach known in the art for calculating frequency harmonics. A ratio of harmonics calculated using the generated data in the aforementioned configuration is calculated using approaches previously discussed herein to yield a ratio H2. H2 reflects the harmonics contribution from the analog front end circuit excluding the preamplifier circuit. Once the ratios are calculated (blocks 635, 640 or blocks 645, 670), the circuit is re-configured for standard processing (i.e., standard write data input, and the analog front end connected through the storage medium) (block 680).

Once either standard servo data processing is completed (block 615) or harmonics ratios are calculated based on the periodic data (block 640 or block 670), a ratio of the harmonics ratios is then calculated in accordance with following equation:

$H01 = H0/H1$ if the first bypass option (blocks 635, 640) is used, $H02 = H0/H2$ if the second bypass option (blocks 645, 670) is used, (block 675) where H0 is the harmonic ratio measured during the standard servo data processing so that H0 contains the harmonic contributions from head-medium signal and analog front-end circuits. Since the harmonic ratio H0 is the product of the harmonic ratios from head-medium signal and analog front-end circuits, by dividing H0 with H1, the contribution due to the analog front end circuit including preamplifier is eliminated. Thus, H01 reflects the harmonic ratio due to the head-medium signal alone. Similarly, by dividing H0 with H2, the contribution due to the analog front end circuit excluding preamplifier is eliminated. Thus, H02 reflects the harmonic ratio due to the head-medium signal and preamplifier. The aforementioned approach may be used for analog front end calibration when, for example, changes in pressure, temperature and/or voltage occur. In some cases, this calibration may be performed whenever harmonic ratios in a given circuit are measured.

In conclusion, the invention provides novel systems, devices, methods and arrangements for measuring harmonics. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for calculating harmonics, the method comprising:
   providing a data processing circuit;
   receiving a first data set derived from a first data source during a servo data processing period;
   performing a first harmonics calculation using the first data set to yield a first harmonics ratio;
   receiving a second data set derived from a second data source during a user data processing period;
   performing a second harmonics calculation using the second data set to yield a second harmonics ratio; and
   calculating an output ratio of the first harmonics ratio to the second harmonics ratio.

2. The method of claim 1, wherein the data processing circuit includes a preamplifier circuit operable to receive an analog input signal from one of the first data source and the second data source, wherein the preamplifier circuit is operable to provide a data output from which the first data set is derived, and wherein the method further comprises:
   bypassing the preamplifier circuit such that the data output is derived directly from the analog input signal derived from the second data source.

3. The method of claim 2, wherein the first data source is a read/write head assembly.

4. The method of claim 2, wherein the second data source is a periodic data circuit operable to provide a periodic output signal.

5. The method of claim 1, wherein the first data source is a read/write head assembly operable to receive information from a storage medium, wherein the data processing circuit further comprises a preamplifier circuit operable to receive an analog input signal from one of the read/write head assembly and the second data source, wherein the preamplifier circuit provides a data output from which both the first data set and the second data set are derived, and wherein the method further comprises:
   bypassing the read/write head assembly such that the second data source is selected as the source of the analog input signal.

6. The method of claim 5, wherein the second data source is a periodic data circuit operable to provide a periodic output signal as the analog input signal.

7. The method of claim 1, wherein the method further comprises:
   determining an operational change, and wherein receiving the second data set during the user data processing period and performing the second harmonics calculation is done based at least in part upon determining the operational change.

8. The method of claim 7, wherein the operational change includes a change selected from a group consisting of: a voltage change, a temperature change, and an altitude change.

9. A data processing system, the data processing system comprising:
   a first data source;
   a second data source;
   an input circuit configurable to receive data from the first data source during a servo data processing period, and configurable to receive data from the second data source during a user data processing period; and
   a harmonic calculation circuit, wherein the harmonic calculation circuit is operable to calculate a first harmonic value based on data derived from the first data source and to calculate a second harmonic value based on data derived from the second data source.

10. The data processing system of claim 9, wherein the first harmonic value is a first harmonic ratio, and wherein the second harmonic value is a second harmonic ratio.

11. The data processing system of claim 10, wherein the harmonic calculation circuit is further operable to calculate an output ratio of the first harmonic ratio and the second harmonic ratio.

12. The data processing system of claim 9, wherein the data processing circuit further comprises:
   a servo data processing circuit operable to process data derived from the first data source during the servo data processing period; and
   a user data processing circuit operable to process data derived from the second data source during the user data processing period.

13. The data processing system of claim 9, wherein the data processing circuit further comprises an operation status sensor circuit, and wherein configuring the input circuit is based at least in part on an output of the operation status circuit.

14. The data processing system of claim 13, wherein the operation status sensor circuit receives status inputs selected from a group consisting of: an altitude input, a voltage input, and a temperature input.

15. The data processing system of claim 9, wherein the first data source is a read/write head assembly.

16. The data processing system of claim 9, wherein the second data source is a periodic data circuit operable to provide a periodic output signal.

17. The data processing system of claim 9, wherein the input circuit includes a preamplifier circuit configurable to receive an analog input signal from one of the first data source and a second source, wherein the preamplifier circuit provides a data output from which the data from the first data source is derived, and wherein the configuring the input circuit to receive data from the second data source during the user data processing period includes bypassing the preamplifier circuit.

18. The data processing system of claim 9, wherein the first data source is a read/write head assembly, and wherein the input circuit includes a preamplifier circuit operable to receive the data from one of the read/write head assembly and the second data source, and wherein the configuring the input circuit to receive data from the second data source during the user data processing period includes bypassing the read/write head assembly.

19. A hard disk drive system, wherein the system comprises:
   a storage medium;
   a read/write head assembly operable to receive a first data set from the storage medium;
   a periodic data circuit operable to provide a periodic data set;
   an input circuit configurable to receive the first data set during a servo data processing period, and one of the periodic data set and a second data set from the storage medium during a user data processing period; and
   a harmonic calculation circuit, wherein the harmonic calculation circuit is operable to calculate a first harmonic value based on a portion of the first data set, and to calculate a second harmonic value based at least in part on of the periodic data set.

20. The system of claim 19, wherein the first harmonic value is a first harmonic ratio, wherein the second harmonic value is a second harmonic ratio, and wherein the harmonic calculation circuit is further operable to calculate a ratio of the first harmonic ratio and the second harmonic ratio.

* * * * *